United States Patent [19]

Hashimoto et al.

[11] 4,324,304
[45] Apr. 13, 1982

[54] CRAWLER-TYPE LOWER MACHINERY

[75] Inventors: Hiroshi Hashimoto; Masaru Kaneko; Yoshihiro Kuge, all of Akashi, Japan

[73] Assignee: Mitsubishi Jukogyo Kabushiki Kaisha, Japan

[21] Appl. No.: 182,778

[22] Filed: Aug. 29, 1980

[30] Foreign Application Priority Data

Sep. 5, 1979 [JP] Japan .................. 54/122586[U]

[51] Int. Cl.³ ............................... B62D 55/00
[52] U.S. Cl. ......................... 180/9.52; 180/9.2 R; 180/41; 280/6 H
[58] Field of Search ............ 180/9.2 R, 9.5, 9.52, 180/9.54, 41; 280/6 R, 6 H, 6.11

[56] References Cited

U.S. PATENT DOCUMENTS 2,121,189  6/1938  Dorward ..................... 280/6 H
3,117,647  1/1964  Polko ........................... 180/41
3,184,867  5/1965  Symmank ................. 280/6.11

FOREIGN PATENT DOCUMENTS 1517359  3/1968  France .................. 280/6 H

Primary Examiner—Joseph F. Peters, Jr.
Assistant Examiner—Donn McGiehan
Attorney, Agent, or Firm—McGlew and Tuttle

[57] ABSTRACT

A crawler-type lower machinery comprises a pair of crawlers, left and right, a main frame and a rocking beam both connecting the two crawlers together, an intermediate frame connecting the main frame with the rocking beam, a table mounted on the main frame, and two groups of lift means arranged at right angles to each other, one group being located between the main frame and the table and the other between the intermediate frame and the main frame. When traveling, the two crawlers are able to pitch and sway, independently of each other, along the ups and downs of the ground. The lift means are operable so that the inclination of the table with respect to the crawler-bearing ground surface can be adjusted in every direction.

2 Claims, 1 Drawing Figure

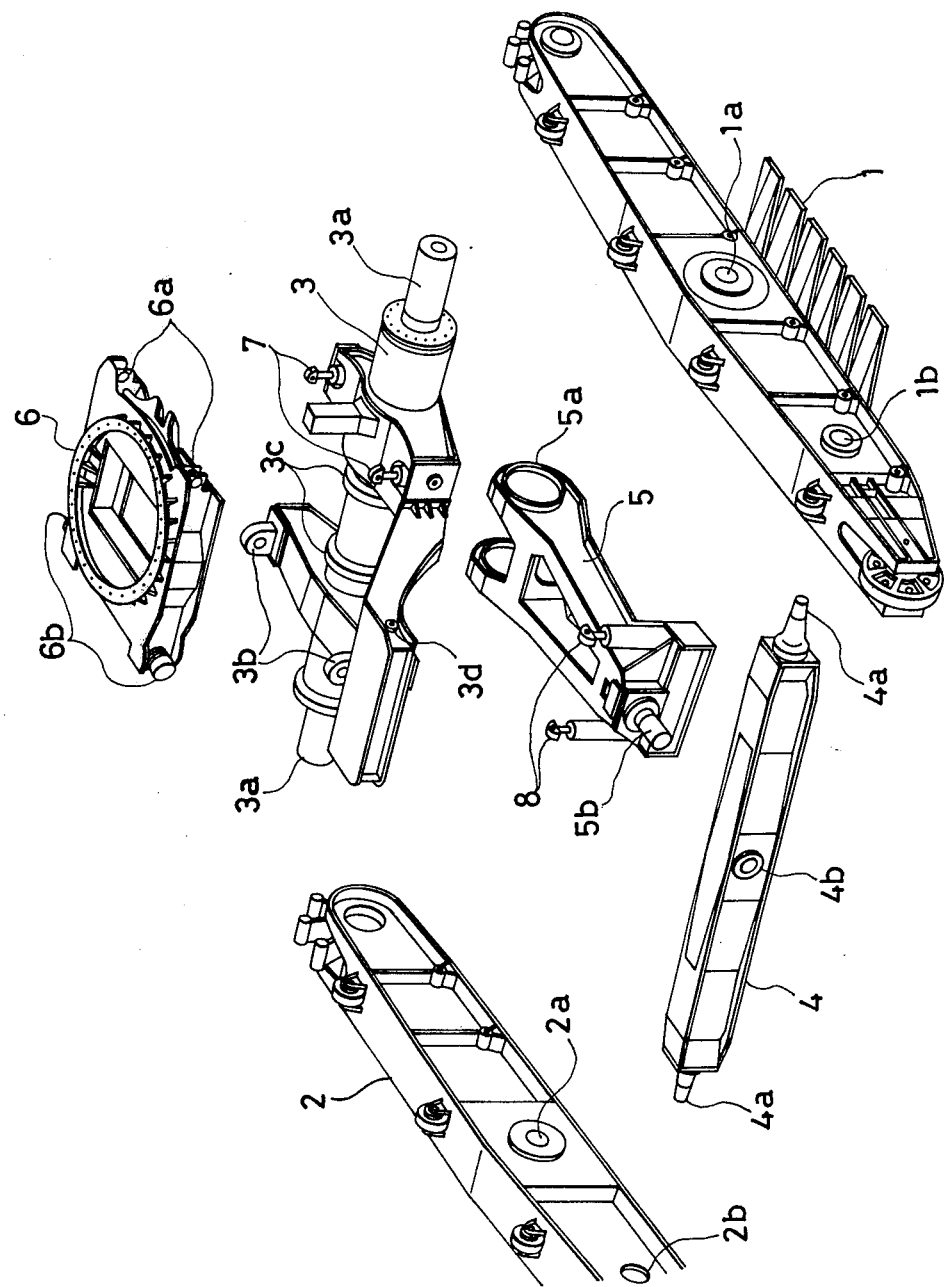

CRAWLER-TYPE LOWER MACHINERY

This invention relates to a crawler-type lower machinery.

With the introduction of crawler-type vehicles in larger models, suspension systems of rocking types have been chosen for them in preference to fixed ones in order to meet the heavy-duty performance requirements. Also, the crawler-type lower machinery, which forms the lower structure of bulldozers and other excavators, transportation vehicles, portable conveyors, and the like, must always support the upper structure horizontally, on even and uneven grounds, to permit the latter to do the work steadily.

The present invention has for its object to provide a crawler-type lower machinery of a four-point-supporting, rocking system equipped with a leveling mechanism adjustable in all directions. With this feature the lower machinery, on whatever inclined grounds, can simply keep the upper structure horizontal.

The invention is applicable to spreaders, wagon-mounted belt conveyors, bucket-wheel excavators, and the like.

Other objects and features of the invention will become apparent from the following description of a preferred embodiment with reference to the accompanying drawing.

The single FIGURE is an exploded view of a crawler-type lower machinery embodying the invention, with most of the continuous tracks removed to show the normally hidden construction.

Referring to the drawing, a left crawler 1 and a right crawler 2 have openings formed in approximately central portions 1a, 2a, respectively, of their lengths and receive therein shafts 3a extended from the opposite ends of a main frame 3 held between, and at right angles to, the crawlers, so that the crawlers can be only turned pivotally without restriction relative to the main frame. At points a short distance away from the central portions of the left and right crawlers 1, 2, there are formed bearing holes 1b, 2b, respectively, in which are fitted shafts 4a at both ends of a rocking beam 4. The shafts 4 are journaled in the bearing holes 1b, 2b to be freely turnable, rockable, and slidable longitudinally of the rocking beam 4. The connections themselves are conventional means, and the detailed explanation is omitted.

An intermediate frame 5, parallel to the crawlers, has a bifurcated end provided with divisible bearings 5a, each of which can be divided into two half-round parts. These bearings 5a are thus only turnably fitted over collars 3c on central portions of the main frame 3.

The other end of the intermediate frame 5 carries a shaft 5b, which in turn is rotatably and axially slidably journaled in a hole 4b formed in the center of the rocking beam 4. The connection is of such a conventional design that no explanation will be necessary.

The main frame 3 includes lift means 7 consisting of a pair of hydraulic cylinders. Similarly, the intermediate frame 5 has lift means 8 or a pair of hydraulic cylinders. The two groups of lift means are spaced suitable distances from the center point of the whole lower machinery and are arranged at right angles to each other. The lift means 8 are connected at the upper ends to holed tabs 3d projecting from the central portions of the main frame 3 by pins or the like. This enables the main frame 3 to turn or incline through a predetermined angle with respect to the intermediate frame 5. The upper ends of the lift means 7 are connected, by pins or the like, to holed tabs 6a at one side edge of a table 6 to support the table on the same side.

Two pivots 6b provided at corners of the table 6 are fitted only turnably in corresponding fulcrum holes 3b formed on the main frame 3.

The operation and advantageous effects of the lower machinery are as follows. As it travels on uneven (and inclined) grounds, the left and right crawlers 1, 2 turn or pitch with respect to their central portions 1a, 2a so as to follow the ups and downs of the ground surface.

At the same time, the rocking beam 4 supported at both ends by the bearings holes 1b, 2b sway, too, with slight turning, rocking and axially sliding motions of its shafts 4a in the holes.

Because the intermediate frame 5 is supported by the main frame 3 and the rocking beam 4, the pitching movements of the crawlers relative to their central portions 1a, 2a are accompanied with slight turns of the bearings 5a of the intermediate frame 5, simultaneously with slight turns and axial sliding motions of the shaft 5b at the opposite end of the frame. In this way the upper load is at all times borne at the four points 1a, 1b, 2a, 2b.

When the crawlers 1, 2 move into a rugged or hilly area, it is important that the table 6 carring the upper structure not shown should remain horizontal despite the undulations of the ground. Then, either or both of the lift means 7, 8, provided in pairs normal to each other underneath the table 6, are suitably actuated by the operator for horizontal control, thereby leveling the upper surface of the table regardless of the bearing surface conditions of the crawlers 1, 2 (i.e., the ground inclinations).

While an embodiment of the invention has been described as incorporating lift means consisting of two pairs of hydraulic cylinders, it is possible to replace each pair of the cylinders by a single cylinder. As a further alternative, mechanical lift means, such as the screw-type ones, may be adopted in place of the hydraulic cylinders.

As has been described hereinbefore, the crawler-type lower machinery according to the invention attains stability in moving over uneven grounds with the aid of the four-point supporting mechanism and, moreover, the horizontality of the upper structure mounted on the table can be controlled, independently of the ground inclinations, through manipulation of the lift means.

What is claimed is:

1. A crawler-type lower machinery comprising a pair of crawlers, left and right, a main frame and a rocking beam both connecting the two crawlers together, an intermediate frame connecting the main frame with the rocking beam, a table mounted on the main frame, and two groups of lift means arranged at right angles to each other, one group being located between the main frame and the table and the other between the intermediate frame and the main frame, said two crawlers when traveling being able to pitch and sway, independently of each other, along the ups and downs of the ground, said lift means being operable so that the inclination of the table with respect to the crawler-bearing ground surface can be adjusted in every direction.

2. A crawler-type lower machinery according to claim 1, wherein said left and right crawlers are turnably pivoted to shafts at the opposite ends of said main frame, the both ends of said rocking beam are turnably, rockably, and axially slidably connected to said both crawlers, said intermediate frame is jointed at one end turnably to said main frame and at the other end turnably and axially slidably to said rocking beam, said lift means in one group are provided on said intermediate frame to support one end of said main frame, said table is turnably supported on one side by one end of said main frame, and said lift means in the other group are provided on said main frame to support the opposite side of said table.

* * * * *